US008255155B1

United States Patent
Crane et al.

(10) Patent No.: US 8,255,155 B1
(45) Date of Patent: Aug. 28, 2012

(54) METHODS OF DETECTING A SPEED DETECTION OF A VEHICLE AND SUPPORTING APPARATUS, SYSTEM, AND READABLE MEDIUM

(75) Inventors: Aaron I. Crane, Palatine, IL (US); Timothy W. Gibson, Barrington, IL (US)

(73) Assignee: Navteq B.V. (NL)

( * ) Notice: Subject to any disclaimer, the term of this patent is extended or adjusted under 35 U.S.C. 154(b) by 818 days.

(21) Appl. No.: 11/484,265

(22) Filed: Jul. 11, 2006

(51) Int. Cl.
*G01C 21/00* (2006.01)
*G08G 1/123* (2006.01)
*G08G 1/09* (2006.01)

(52) U.S. Cl. .................... 701/409; 340/905
(58) Field of Classification Search ............ 340/905, 340/936, 988
See application file for complete search history.

(56) References Cited

U.S. PATENT DOCUMENTS

| 6,076,041 | A * | 6/2000 | Watanabe | 701/437 |
| 6,201,493 | B1 * | 3/2001 | Silverman | 342/20 |
| 6,204,798 | B1 | 3/2001 | Fleming, III | 342/20 |
| 6,670,905 | B1 | 12/2003 | Orr | 342/20 |
| 7,016,772 | B2 * | 3/2006 | Yanagi | 701/21 |
| 7,023,374 | B2 * | 4/2006 | Jossef et al. | 342/20 |
| 7,098,844 | B2 * | 8/2006 | Orr et al. | 342/174 |
| 7,124,027 | B1 * | 10/2006 | Ernst et al. | 701/301 |
| 2003/0052797 | A1 * | 3/2003 | Rock et al. | 340/936 |
| 2006/0132349 | A1 * | 6/2006 | Stern et al. | 342/20 |

OTHER PUBLICATIONS

Snooper Indago Satellite Navigation (http://www.radardetectors.co.uk/snooper_indago.htm), pp. 1-3 (2005).

* cited by examiner

*Primary Examiner* — Thomas Tarcza
*Assistant Examiner* — Imran Mustafa
(74) *Attorney, Agent, or Firm* — Adil M. Musabji; Frank J. Kozak; Jon D. Shutter

(57) ABSTRACT

A technique of detecting a speed detection of a vehicle using a geographic database (200, 322, 326, 508, 510) of a navigation system (300, 502) has been provided, which obtains a current position of the vehicle (404) and at least one predefined characteristic (418) relating to the current position of the vehicle from the geographic database, sets (420(1)) a sensitivity level to detect a speed detection of the vehicle based, at least in part, on the at least one predefined characteristic.

25 Claims, 9 Drawing Sheets

METHODS OF DETECTING A SPEED DETECTION OF A VEHICLE AND SUPPORTING APPARATUS, SYSTEM, AND READABLE MEDIUM

BACKGROUND

The present invention relates generally to a technique of detecting a speed detection of a vehicle traveling on a road segment, and more particularly to a technique of detecting the speed detection of the vehicle using a geographic database.

Many current vehicle radar detectors include a manually operated switch that changes the sensitivity of the detector. The sensitivity settings in vehicle radar detectors are generally city versus highway detection. The highway setting provides for a more sensitive and broader range of detection, while the city setting provides for a less sensitive and narrower range of detection for avoiding interferences that would output a false alarm. A false alarm is the occurrence of an alarm from the vehicle radar detector as a result of radar signals emanating from fixed objects (such as burglar alarms and automatic garage door openers) rather than from a police speed detector. This requirement of manual switching between these different settings, however, may be cumbersome for some drivers. Moreover, the driver is required to determine the correct setting given a geographic area. Accordingly, there exists a need for improvement of the vehicle radar detectors.

SUMMARY OF THE INVENTION

To address these and other objectives, the present invention provides, according to one embodiment, a method of detecting a speed detection of a vehicle using a geographic database of a navigation system that obtains a current position of the vehicle and obtains at least one predefined characteristic relating to the current position of the vehicle from the geographic database. Based, at least in part, on this predefined characteristic, a sensitivity level is set to detect a speed detection of the vehicle. In a specific embodiment, the speed detection is detected based, at least in part, on the sensitivity level.

In another embodiment, a user of the vehicle is alerted upon detecting the speed detection. According to one embodiment, a transmission needed to block the speed detection is periodically sent based, at least in part, on a retransmit level. This retransmit level may be set based, at least in part, on the predefined characteristic. For one particular embodiment, a current speed of the vehicle is obtained. A speed limit along a road traveled by the vehicle is further obtained from the geographic database. A determination is then made as to whether the current speed of the vehicle corresponds in at least a predetermined way to the speed limit along the road. When the current speed of the vehicle corresponds in at least a predetermined way to the speed limit along the road, the user of the vehicle is alerted upon detecting the speed detection and/or the transmission needed to block the speed detection is periodically transmitted.

For one particular embodiment, a determination is also made as to whether a speed trap data record associated with the current position of the vehicle is present in the geographic database. And if not, a road segment data record associated with the current position of the vehicle is used for obtaining the predefined characteristic. Otherwise, when a speed trap data record is present, the speed trap data record associated with the current position is accordingly used for obtaining the predefined characteristic.

According to various embodiments, a method of detecting a speed detection of a vehicle using a geographic database of a navigation system is further provided. In this method, upon obtaining a current position of the vehicle, a determination is made as to whether a speed trap data record associated with the current position of the vehicle is present in the geographic database. When the speed trap data record associated with the current position of the vehicle is present in the geographic database, at least one predefined characteristic is obtained from the speed trap data record. A sensitivity level is further set for detecting a speed detection of the vehicle based, at least in part, on the predefined characteristic(s). According to a specific embodiment, the speed detection of the vehicle is detected based, at least in part, on the sensitivity level.

According to various embodiments, a system of detecting a speed detection of a vehicle using a geographic database of a navigation system is provided, which includes a position system that obtains a current position of a vehicle, a processor operably coupled to the position system that obtains at least one predefined characteristic relating to the current position of the vehicle from the geographic database, a vehicle radar detector operably coupled to the processor, and a speed trap system operably coupled to the radar detector that sets a sensitivity level to detect a speed detection of the vehicle based, at least in part, on the at least one predefined characteristic.

Still yet other various embodiments, a memory having a data structure of a geographic database, wherein the data structure includes a first field having a speed trap identification identifying a speed trap on a road segment, a second field having a road segment identification identifying the road segment, a third field having a sensitivity level for detecting a speed detection from the speed trap. According to an embodiment, a forth field having at least one characteristic relating to the road segment is further included. In another embodiment, a fifth field having a speed trap type identifying a type of the speed trap is also included. For one embodiment, a sixth field having a retransmit level is further included for blocking the speed detection from the speed trap.

According to various embodiments, the predefined characteristic may be from a predefined sensitivity level, population density, an administrative district, a shopping district, a residential area, a business district, a number of nearby points of interest, a functional class of a road, speed limit, traffic information, a geometric shape of a road, speed detection type, speed trap indication, and any attribute that can be used to set the sensitivity level. In another embodiment, the speed detection comprises any one or more selected from a group of a signal transmission and a laser burst transmission.

Through the embodiments of various teachings, a more intelligent technique of detecting police speed detectors has been provided that, among other things, automatically, substantially without any manual intervention, switches the sensitivity and retransmit level of the vehicle radar detector using a geographic database of a navigation system. As a result, the protection to the drivers is largely transparent, while providing a more accurate detection of the police speed detectors. Moreover, false alarms would also be greatly reduced since multiple characteristics are considered. Thus, the vehicle radar detector can effectively detect the police speed detector in a given geographic location with minimal end user intervention.

BRIEF DESCRIPTION OF THE DRAWINGS

The accompanying figures, where like reference numerals refer to identical or functionally similar elements throughout the separate views and which together with the detailed description below are incorporated in and from part of the specification, serve to further illustrate various embodiments and to explain various principles and advantages all in accordance with the present invention.

Figure 1:
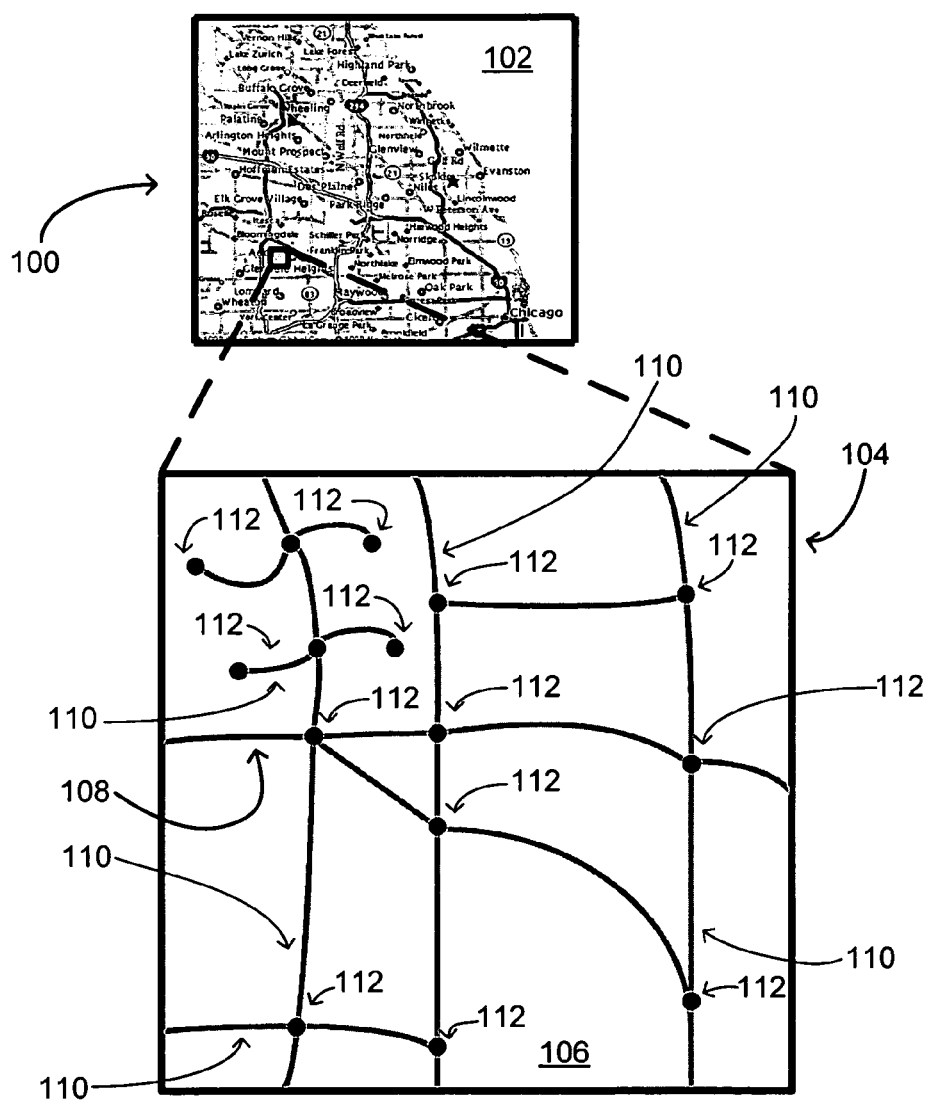
FIG. 1 shows a map of a geographic region shown in FIG. 1.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are typically not depicted in order to facilitate a less obstructed view of these various embodiments of the present invention.

DETAILED DESCRIPTION

As required, detailed embodiments of the present invention are disclosed herein. It is to be understood, however, that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriate detailed structure. Further, the terms and phrases used herein are not intended to be limiting, but rather to provide an understandable description of the invention.

Furthermore, the terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software application," "firmware," "circuit," and the like as used herein, are defined as a sequence of instructions designed for execution on a computer system. A program, computer program, software application, firmware, or circuit may include a subroutine, a function, a procedure, an object method, an object implementation, an executable application, an applet, a servlet, a source code, an object code, a shared library/dynamic load library and/or other sequence of instructions designed for execution on a computer system. Since multiple embodiments of vehicle radar detectors are contemplated, "vehicle radar detectors" refer to any type of devices that detects or blocks a police speed detector (e.g., police vehicles, camera devices, helicopters, or the like) that may use any type of transmissions, such as a radio frequency signal or a laser burst, to detect the speed of the vehicle. As such, a "vehicle radar detector" refers to a radar detector that is installed to the vehicle for detecting a police speed detection, while "police speed detector" refers to any type of the speed detectors used in police vehicles, police camera devices, or the like. Moreover, the term "obtain" is used to broadly describe the multiple exemplary computer functions of, but not limited to, hashing, wrapping, accessing, extrapolating, collecting, calculating, computing, detecting, evaluating, determining, and/or searching.

I. Geographic Map Database

A. Geographic Database

FIG. 1 illustrates a map 100 of a geographic region 102. The geographic region 102 may correspond to a metropolitan or rural area, a state, a country, or combinations thereof, or any other area. Located in the geographic region 102 are physical geographic features, such as roads, points of interest (including businesses, municipal facilities, etc.), speed traps, lakes, rivers, railroads, municipalities, etc.

FIG. 1 also includes an enlarged map 104 of a portion 106 of the geographic region 102. The enlarged map 104 illustrates part of a road network 108 in the geographic region 102. The road network 108 includes, among other things, roads and intersections located in the geographic region 102. As shown in the portion 106, each road in the geographic region 102 is composed of one or more road segments 110. A road segment 110 represents a portion of the road. Each road segment 110 is shown to have associated with it two nodes 112, specifically one node represents the point at one end of the road segment and the other node represents the point at the other end of the road segment. The node 112 at either end of a road segment 110 may correspond to a location at which the road meets another road, i.e., an intersection, or where the road dead-ends.

Figure 2:
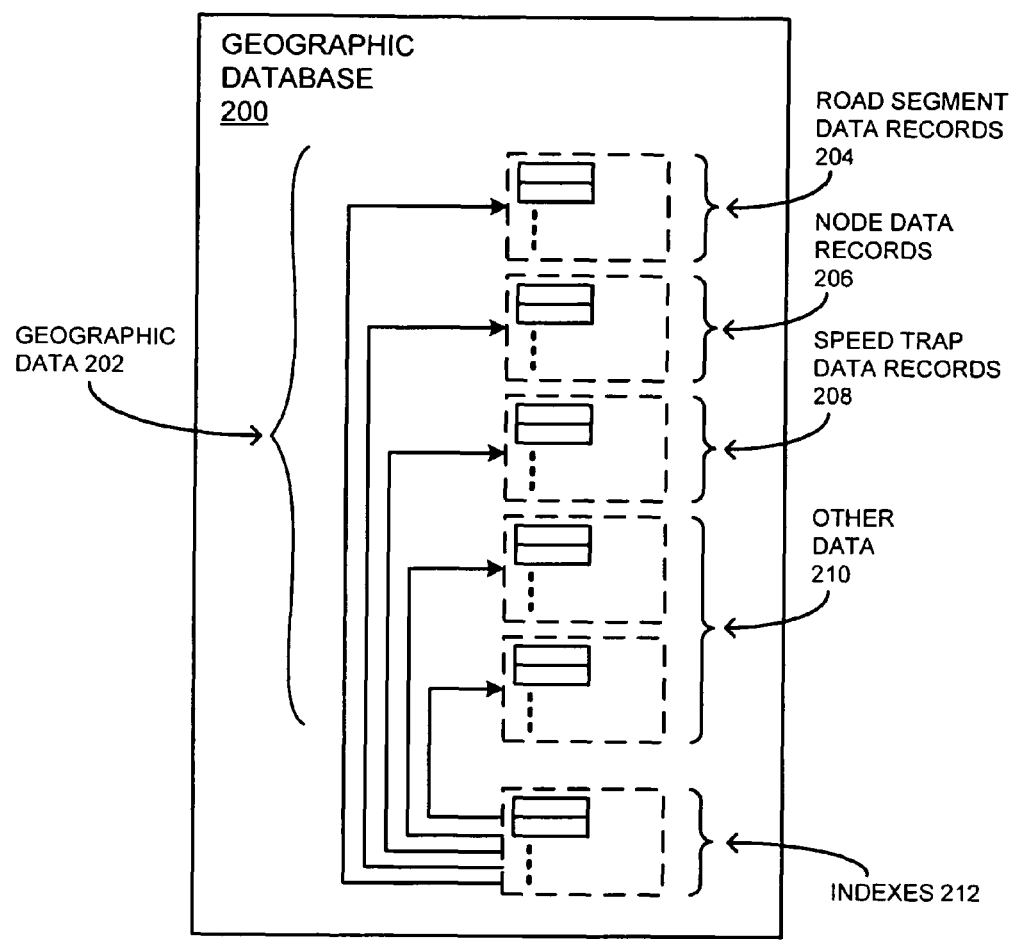
FIG. 2 is a block diagram of a geographic database according to various embodiments.

Referring to FIG. 2, a geographic database 200 contains data 202 that represents some of the physical geographic features in the geographic region 102 depicted in FIG. 1. The data 202 contained in the geographic database 200 includes data that represent the road network 108. In the embodiment of FIG. 2, the geographic database 200 that represents the geographic region 102 contains at least one road segment database record 204 (also referred to as "entity" or "entry") for each road segment 110 in the geographic region 102. The geographic database 200 that represents the geographic region 102 also includes a node database record 206 (or "entity" or "entry") for each node 112 in the geographic region 102. The terms "nodes" and "segments" represent only one terminology for describing these physical geographic features, and other terminology for describing these features is intended to be encompassed within the scope of these concepts.

The geographic database 200 includes speed trap data records 208. The speed trap data records 208 represent various information relating to speed traps located in the geographic region 102. For example, the speed trap data records 208 may include data representing known speed camera traps, speed detection traps, and/or the type of transmission being used for detecting speed located in the geographic region 102. The geographic database 200 may also include other kinds of data 210, which may represent other kinds of geographic features or anything else. The geographic database 200 also includes indexes 212. The indexes 212 may include various types of indexes that relate to different types of data to each other or that relate to other aspects of the data contained in the geographic database 200. For example, the indexes 212 may relate speed trap data in the speed trap data records 208 with a road segment in the segment data records 204.

B. Road Segment Data Record

Figure 3:
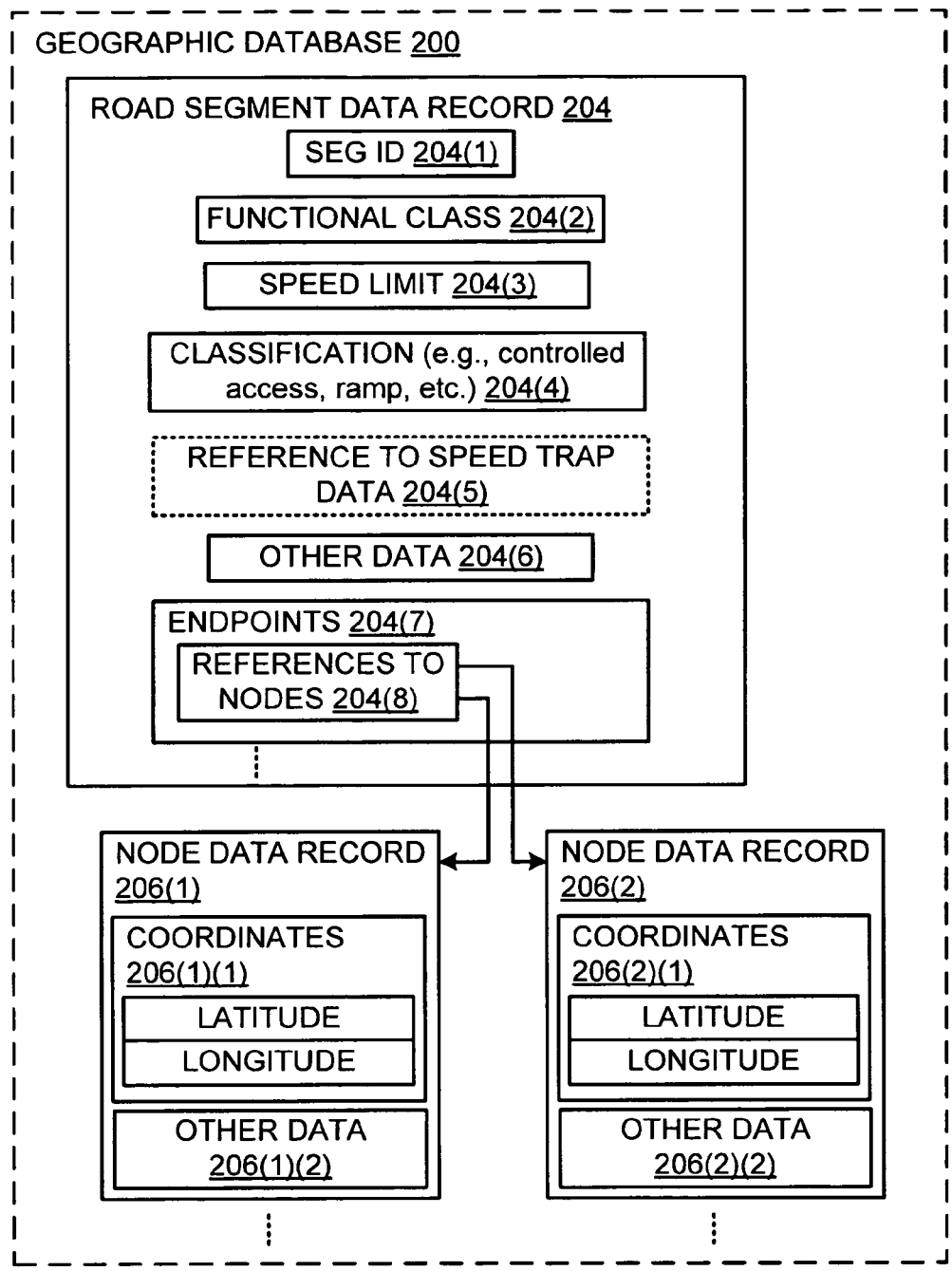
FIG. 3 is a block diagram of components of data records contained in the geographic database depicted in FIG. 2 according to various embodiments.

FIG. 3 shows some of the components of a road segment data record 204 contained in the geographic database 200. The road segment data record 204 includes a segment identification ("ID") 204(1) by which the data record can be identified in the geographic database 200. Each road segment data record 204 has associated with it information (such as "attributes", "fields", etc.) that describes features of the represented road segment. The road segment data record 204 may include data 204(2) that indicate the functional class.

There are currently five levels of functional class. In particular, functional class "1" applies to roads with very few, if any, speed changes, which allow for high volume, maximum speed traffic movement between and through major metropolitan areas. Functional class "2" are roads with very few, if any, speed changes that allow for high volume, high speed traffic movement used to channel traffic to functional class "1" roads for travel between and through cities in the shortest amount of time. Functional class "3" applies to roads providing a high volume of traffic movement at a lower level of mobility than, but are interconnected to, functional class "2" roads. Functional class "4" applies to roads that provide for a high volume of traffic movement at moderate speeds between neighborhoods, but are connected with higher class roads to collect and distribute traffic between neighborhoods. Functional class "5," which also include walkways, truck only roads, bus only roads, and emergency vehicle only roads, applies to roads having volume and traffic movement that are below the level of any other functional class. These functional classes of the roads may be considered when determining a travel route for a destination.

The road segment data record 204 also includes data 204(3) that indicate a speed limit or speed category (i.e., the maximum permitted vehicular speed of travel) on the represented road segment. The road segment data record 204 may also include data 204(4) for indicating a classification of whether the represented road segment is part of a controlled access road (such as an expressway), a ramp to a controlled access road, a bridge, a tunnel, a toll road, a ferry, and so on. The road segment data record 204 may also include data 204(5) indicating a reference to data related to the speed trap located along the road segment.

The road segment data record 204 may also include or be associated with other data 204(6) that refer to various other attributes of the represented road segment. The various attributes associated with a road segment may be included in a single road segment record, or may be included in more than one type of record with cross-references to each other. For example, the road segment data record 204 may include data identifying what turn restrictions exist at each of the nodes which correspond to intersections at the ends of the road portion represented by the road segment, the name or names by which the represented road segment is known, the street address ranges along the represented road segment, and so on.

The road segment data record 204 also includes data 204(7) providing the geographic coordinates (e.g., the latitude and longitude) of the end points of the represented road segment. In one embodiment, the data 204(7) are references 204(8) to the node data records 206(1), 206(2) that represent the nodes corresponding to the end points of the represented road segment. Specifically, some of the components of a node data record 206(1), 206(2) contained in the geographic database 200 are shown. Each of the node data records 206(1), 206(2) may have associated information (such as "attributes", "fields", etc.) that allows identification of the road segment(s) that connect to it and/or its geographic position (e.g., its latitude and longitude coordinates). For the embodiment shown in FIG. 3, the node data records 206(1) and 206(2) include the latitude and longitude coordinates 206(1)(1) and 206(2)(1) for their node. The node data records 206(1) and 206(2) may also include other data 206(1)(2) and 206(2)(2) that refer to various other attributes of the nodes.

C. Speed Trap Data Record

Figure 4:
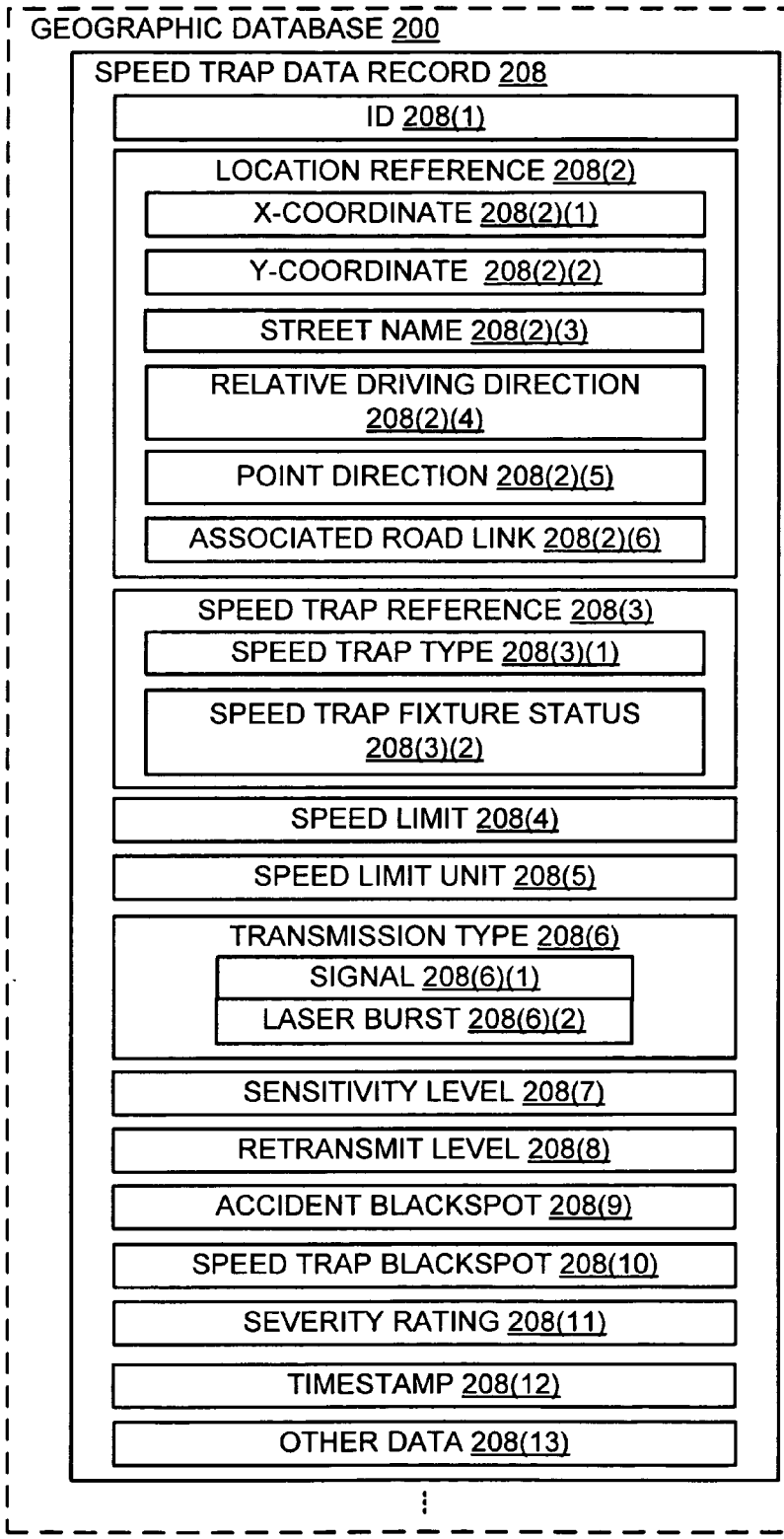
FIG. 4 is a block diagram of speed trap data records contained in the geographic database depicted in FIG. 2 according to various embodiments.

FIG. 4 shows some components of a speed trap data record 208 contained in geographic database 200. The speed trap data record 208 represents various information relating to the speed trap located in the geographic region 102. For example, speed trap information may include known speed camera traps, speed detection traps, the type of transmission used to detect speed, and/or any related information that detects a police speed detector used (e.g., by either police cameras or police vehicles). The speed trap data 208 may also include data representing features and attributes of the speed traps. In one embodiment, the speed trap data record 208 includes a speed trap identification ("ID") 208(1) by which the speed trap can be identified in the geographic database 200.

For example, one or more speed trap data records may include a location reference 208(2) that may further include an latitude 208(2)(1) and a longitude 208(2)(2). Furthermore, a street name 208(2)(3) may be included for indicating either a name and/or a route number that identifies a road associated with the speed trap. A relative driving direction 208(2)(4) may also be included for indicating the heading of the road associated with the speed trap. To provide reference to the road, a point direction 208(2)(5) is included for providing a general direction (e.g., next upcoming exit name, cit name, and/or intersection name) of the road associated with the speed trap and an associated road link 208(2)(6) is included for identifying corresponding link or edge identification of the speed trap. These types of information of the location reference 208(2) of the speed trap data record 208 are shown as examples. As such, other location references are available and contemplated, and they, although not specifically shown, are within the scope of the teachings described.

Turning next to a speed trap reference 208(3) that identifies information relating to the speed trap, a speed trap type 208(3)(1) is included for identifying the type of the speed trap, such as a camera trap, a radar trap, and a laser trap. For speed traps that are fixtures (e.g., police camera), a speed trap fixture status 208(3)(2) is included for indicating whether the speed trap is permanent, semi-permanent, or mobile. A speed limit 208(4) and a speed limit unit 208(5) are also included for indicating the permitted speed on the road segment of the speed trap data record and a unit of the speed limit.

Depending upon the type of speed traps known in the area, the speed trap data record 208 may further include a transmission type 208(6) used by the speed trap. Since radio frequency signals (e.g., radar) 208(6)(1) and laser bursts 208(6)(2) are the most common type of transmissions used by police speed detector, they are shown as an example in FIG. 4. Other transmission types, however, are included as the technology may change. Using these exemplary transmissions, two common ways to detect the police speed detector are known. Specifically, one method is to detect the transmission and alert the user to slow down. In this case, a sensitivity level 208(7) may be optionally included to control and reduce the number of false alarms, while effectively identifying transmissions from the police speed detectors.

According to one embodiment, a geographic researcher (e.g., geographic database field staff) determines the optimal sensitivity level 208(7). Since more characteristics are considered in this method, any oddities are considered when setting the sensitivity level 208(7). For example, if the speed trap is immediately after a curve, the geographic researcher would set the sensitivity level 208(7), based on this curve, to ensure that the end user receives the alert with ample time to reduce speed to the proper speed limit. If, on the other hand, the researcher knows that speed trap is on a highway outside any cities, the sensitivity level can be properly set for the highway level. Specifically, the speed trap data are stored with the geographic database 200, according to one embodiment. The speed trap data record 208 can, then, be accessed by the navigation system in the vehicle. The alert method, however, may not adequately provide the most effective detection of the police speed detectors since there may be false alarms, even with the improved sensitivity level settings.

To address some of the shortcomings of the alert method, the second method of sending a transmission to block the police speed detector is used separately and/or along with the alert method. For the blocking method, a retransmit level 208(8) may be further be included to conserve battery and life expectancy of the vehicle radar detector. This method is especially helpful for any handheld devices where the battery usage is an issue. For example, the retransmit level 208(8) can be set to retransmit more frequently on a highway setting, since the distance travel changes more rapidly than in city setting. Similarly, in city setting, the retransmit level 208(8) may be reduced in order to lessen the usage of the vehicle radar detector for a longer life expectancy, while conserving the battery if needed.

Although the blocking method is the most effective way for warning drivers of these police speed detectors, it may be illegal in some states. Of course, for states with no such restrictive regulations against the blocking of the police speed detectors, a combination of the two techniques may be used. In this case, the sensitivity level 208(7) and retransmit level 208(8) can be set according to one or more predefined characteristics, which may include the attributes of the road segment data record 204 or the speed trap data record 208. As a result, a more effective sensitivity or retransmit level is provided using the geographic database. In an alternative embodiment, the sensitivity level 208(7) and retransmit level 208(8) may be dynamically determined by a process. In this case, the inclusion of the sensitivity level 208(7) and retransmit level 208(8) in the speed trap data record 208 may not be necessary.

Other miscellaneous information may also be included. For example, the speed trap data record 208 includes an accident blackspot 208(9) for identifying the road as a high-risk area for road traffic accident and a severity rating 208(10) of the accident blackspot. The speed trap data record may also include a speed trap blackspot 208(11) that indicates an inadequate detection range to the user, because of a blind spot caused by, for example, a road curvature, a terrain mode, and/or a road gradient or slope. A timestamp 208(12) may be further included for identifying the date when the speed trap data record 208 was collected and/or updated. The speed trap data record 208 also includes a field for any other data 208(13). Because various specific implementations are readily available to a skilled artisan, these various embodiments of the speed trap data record, although may not be specifically shown, are within the scope of the embodiments provided.

II. Navigation System

A. Overview

Figure 5:
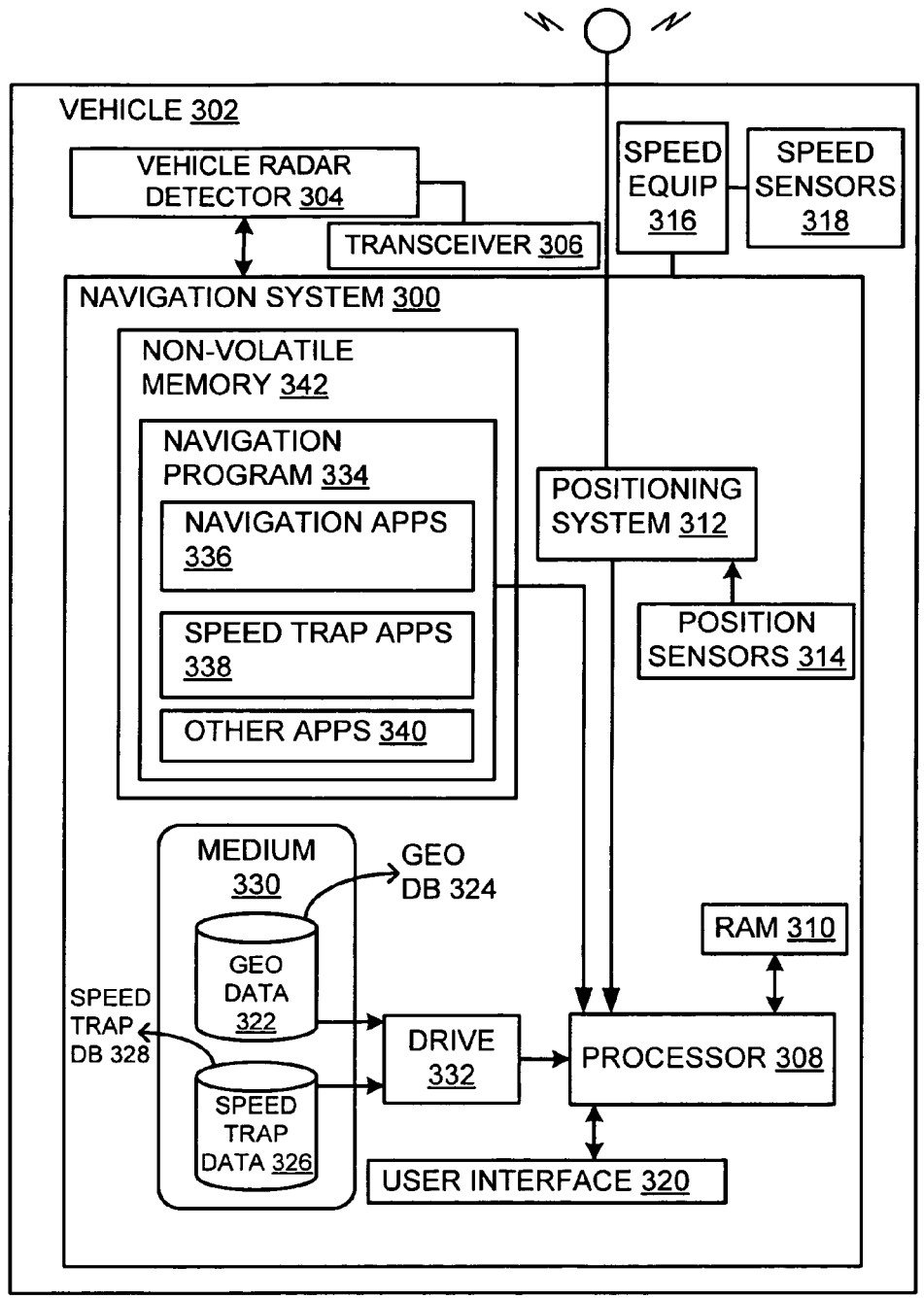
FIG. 5 is a block diagram of a navigation system located in a vehicle according to various embodiments.

FIG. 5, for purposes of providing an illustrative but non-exhaustive example to facilitate this description, a specific operational paradigm using a navigation system is shown and indicated generally at 300. Those skilled in the art, however, will recognize and appreciate that the specifics of this illustrative example are not specifics of the invention itself and that the teachings set forth herein are applicable in a variety of alternative settings. These various platforms and communication implementations are, as a result, within the scope of the invention, and various embodiments for these multiple implementations are readily understood and appreciated by one skilled in the art.

B. Standalone Navigation System

Different kinds of mobile and portable computing platforms are available for obtaining geographically-based features and services by end users. One such example is a standalone system, such as a vehicle navigation system. With the standalone system, the navigation application software and geographic database are located locally, i.e., with the navigation system unit in the vehicle. The standalone systems are capable of performing the navigation applications and speed trap applications.

Referring to FIG. 5, there is a diagram illustrating an exemplary embodiment of a navigation system 300 capable of detecting the speed detection of the vehicle. In the embodiment shown in FIG. 5, the navigation system 300 is located in a vehicle 302, such as an automobile, truck, or bus, and operably coupled to a vehicle radar detector 304 having a transceiver 306. To detect a radar signal and/or laser burst used for detecting the speed of the vehicle 302, the vehicle radar detector 304 tries to detect the transmissions of the radar signal and/or the laser burst before the police speed detector can obtain the actual speed of the vehicle 302. As readily appreciated by one skilled in the art, the vehicle radar detector 304 senses certain range of frequencies used by the police speed detector. Accordingly, the radar detector 304 is adapted to detect the various ranges of frequencies allocated to police radar by the U.S. Federal Communications Commission, including X band (10.475-10.575 GHz), Ku band (13.400-13.500 GHz), K band (24.025-24.275 GHz), and Ka band (34.150-35.250 GHz).

For an embodiment that sends transmissions to block the speed detection of the vehicle 302, the transceiver 306 sends out the necessary transmissions to detract the speed detection of the vehicle 302. Of course, as readily appreciated by one skilled in the art, a receiver can be used in place of a transceiver 306. The vehicle radar detector 304 and transceiver 306 work in conjunction with the navigation system 300 to set the proper sensitivity and retransmit level for detecting the speed detection of the vehicle 302. Because the process of providing the proper sensitivity is substantially transparent to the user of the vehicle 302, the user is not burdened with the responsibility of setting the vehicle radar detector for the specific geographic location.

As shown, the navigation system 300 is a combination of hardware and software components. The hardware components of the navigation system 300 may include a processor 308, memory 310 (e.g., random access memory ("RAM")), and so on. The navigation system 300 also includes positioning system 312 that determines the position of the vehicle 302 in which it is installed. The positioning system 312 may include position sensors 314 or other components that sense the speed, orientation, direction, angular acceleration, and so on, of the vehicle 302. The position system 312 may also include a GPS system. The navigation system 300 also includes speed equipment 316 that determines the speed of the vehicle in which it is installed. The speed equipment 316 may include speed sensors 318 or other components that sense the speed, orientation, direction, angular acceleration, and so on, of the vehicle 302. In another embodiment, the positioning system 312 and speed equipment 316 are combined.

The navigation system 300 also includes a user interface 320. The user interface 320 includes appropriate means for receiving instructions and/or input from an end user of the navigation system 300. The instruction receiving means may include a keyboard, keypad, or other type of input panel, a microphone, as well as other means for accepting end user input, such as voice recognition software, and so on, through which the end user may request navigation information and services. The user interface 320 also includes an appropriate means for providing information back to the end user. The information providing means may include a display and speakers (including speech synthesis hardware and software) through which the end user can be provided with information and services from the navigation system 300. All of the components described above may be conventional (or other than conventional) and the manufacture and use of these components are known to those of skill in the art.

In order to provide navigation features to the end user, the navigation system 300 uses geographic data 322 from a geographic database 324 and speed trap data 326 from a speed trap database 328. The geographic database 324 may contain all or portion(s) of the geographic database 200, depending upon the implemented system. Furthermore, the speed trap database 326 may be implemented as a separate database and/or an integrated database of the geographic database 324. In one embodiment, the geographic database 324 is developed by NAVTEQ North America, LLC of Chicago, Ill. The inventive concepts disclosed herein, however, are not restricted to any particular source of data. The geographic data 322 include information about one or more geographic regions or coverage areas, while the speed trap data 326 include speed trap related information of the geographic regions or coverage areas. The geographic data 322 and the speed trap data 326 may be stored in the vehicle 302 or alternatively, stored remotely and made available to the navigation system 300 in the vehicle 302 through a wireless communication system which may be part of the navigation system 300. In another alternative embodiment, a portion of the geographic data 322 and/or the speed trap data 326 may be stored in the vehicle 302 and other portion(s) may be stored in a remote location, which is made available to the navigation system 300 in the vehicle 302 over a wireless communication system from the remote location.

In the embodiment shown in FIG. 5, some or all of the geographic data 322 and/or speed trap data 326 are stored on a medium 330 which is located in the vehicle 302. Accordingly, the navigation system 300 includes a drive 332 (or other suitable peripheral device) into which the medium 330 can be installed and accessed. In one embodiment, the storage medium 330 is a CD ROM disk. In another alternative embodiment, the storage medium 330 may be a PCMCIA card in which case the drive 332 would be substituted with a PCMCIA slot. Various other storage media may be used, including fixed or hard disks, DVD disks or other currently available storage media, as well as storage media that may be developed in the future.

Referring again to FIG. 5, in addition to the hardware components and geographic database, the navigation system 300 includes or uses a navigation program 334. The navigation program 334, in this embodiment shown, includes navigation applications 336, speed trap applications 338, and other applications 340 that provide for the functions and/or features performed by the navigation system 300. The navigation applications 336 and the speed trap applications 338 use the geographic data 322 and the speed trap data 326 in conjunction with input from the end user via the user interface 320, and possibly in conjunction with outputs from the positioning system 308, to provide various navigation-related features and/or functions, such as route calculation, route guidance, and speed trap protection.

The navigation program 334 may be stored in a non-volatile storage medium 342 in the navigation system 300. Alternatively, the navigation program 334, the geographic data 322, and/or the speed trap data 326 may be stored together on a single storage device or medium. Alternatively, the navigation program 334 may be located at a remote location and may be provided to or accessed by the navigation system 300 over a communications system. In one embodiment, the navigation program 334 is written in the C programming language although in alternative embodiments other programming languages may be used, such as C++, Java, Visual Basic, and so on.

Figure 6:
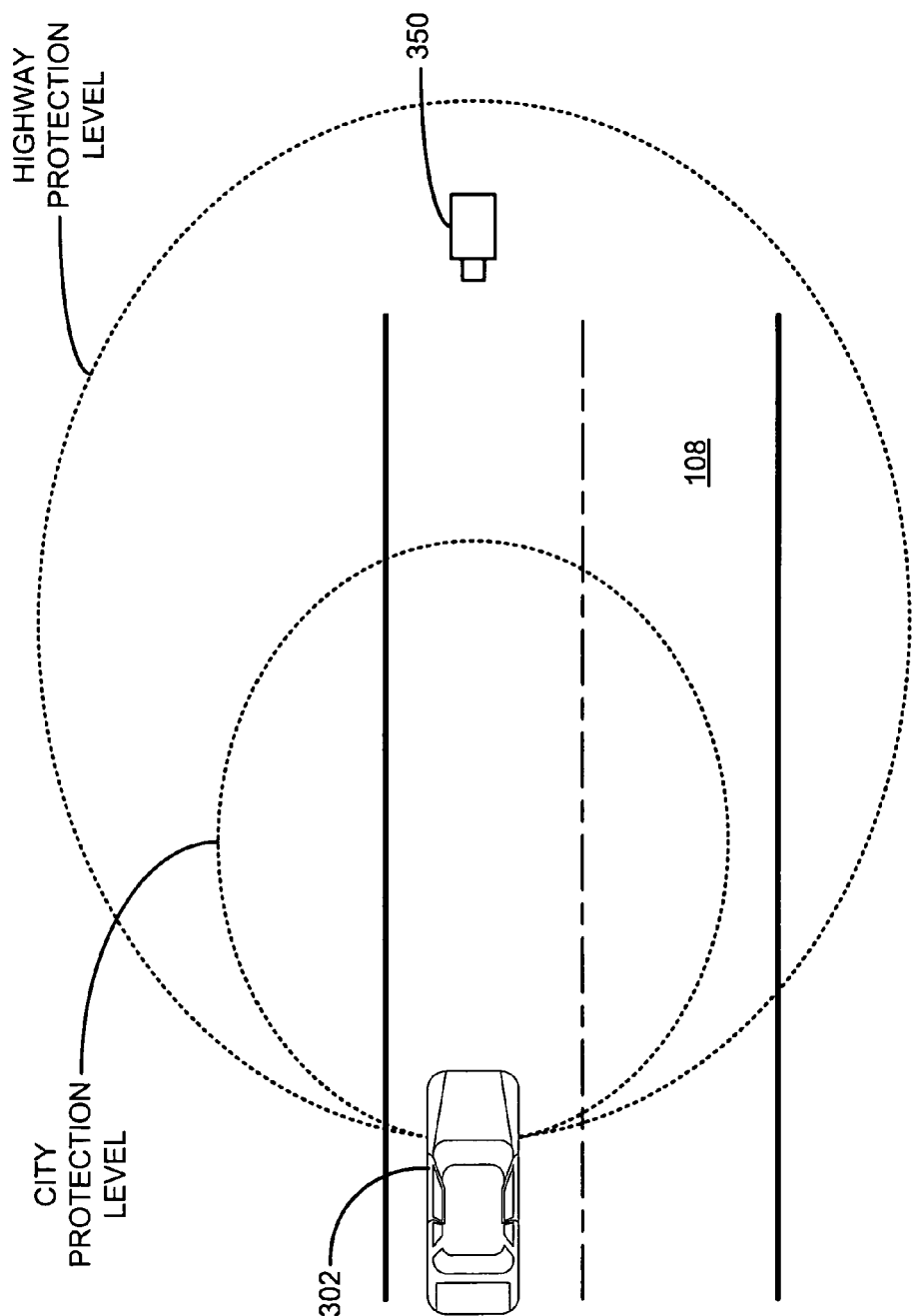
FIG. 6 is an exemplary diagram of the detection range of a highway protection level versus a city protection level.

Turning to an example shown in FIG. 6, a city protection range versus a highway protection range provided by the vehicle radar detector 304 is shown. More specifically, the vehicle radar detector 304 in the vehicle 302 traveling on a road segment 108 may provide a broader distance range and more sensitivity for highway protection, while the city protection range provides a more narrow distance range and is less sensitive to reduce the number of false alarms. To provide these various levels of protection, the sensitivity and retransmit level of the vehicle radar detector 304 is adjusted either dynamically using information from the road segment data record 204 and/or statically using predefined level settings from the speed trap data record 208.

In this example, a speed trap 350 is shown being in the highway level, which includes a broader range. As such, if the vehicle radar detector is set at a highway level, the user will be alerted once the vehicle 302 travels within the range. Otherwise, in the city level, the speed trap 350 is not detected until the vehicle 302 travels within the narrow range of the city level. Since multiple different implementations of the type, number, or range of the level are available and are readily appreciated by one skilled in the art, these other implementations of various levels are within the scope of the various embodiments described.

III. Speed Trap Applications

Figure 7:
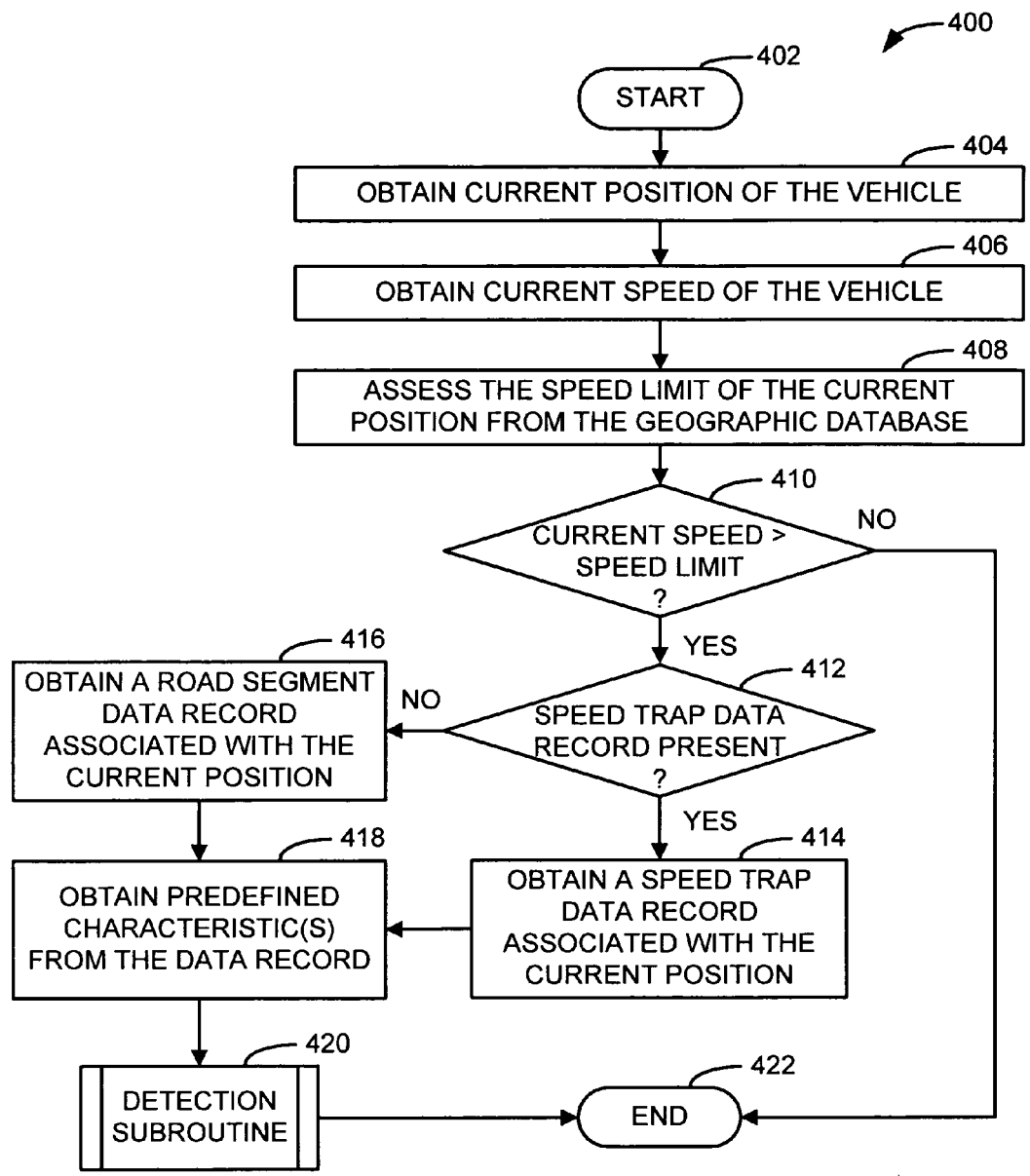
FIG. 7 is a flow chart diagram of a detection process according to various embodiments.
Figure 8:
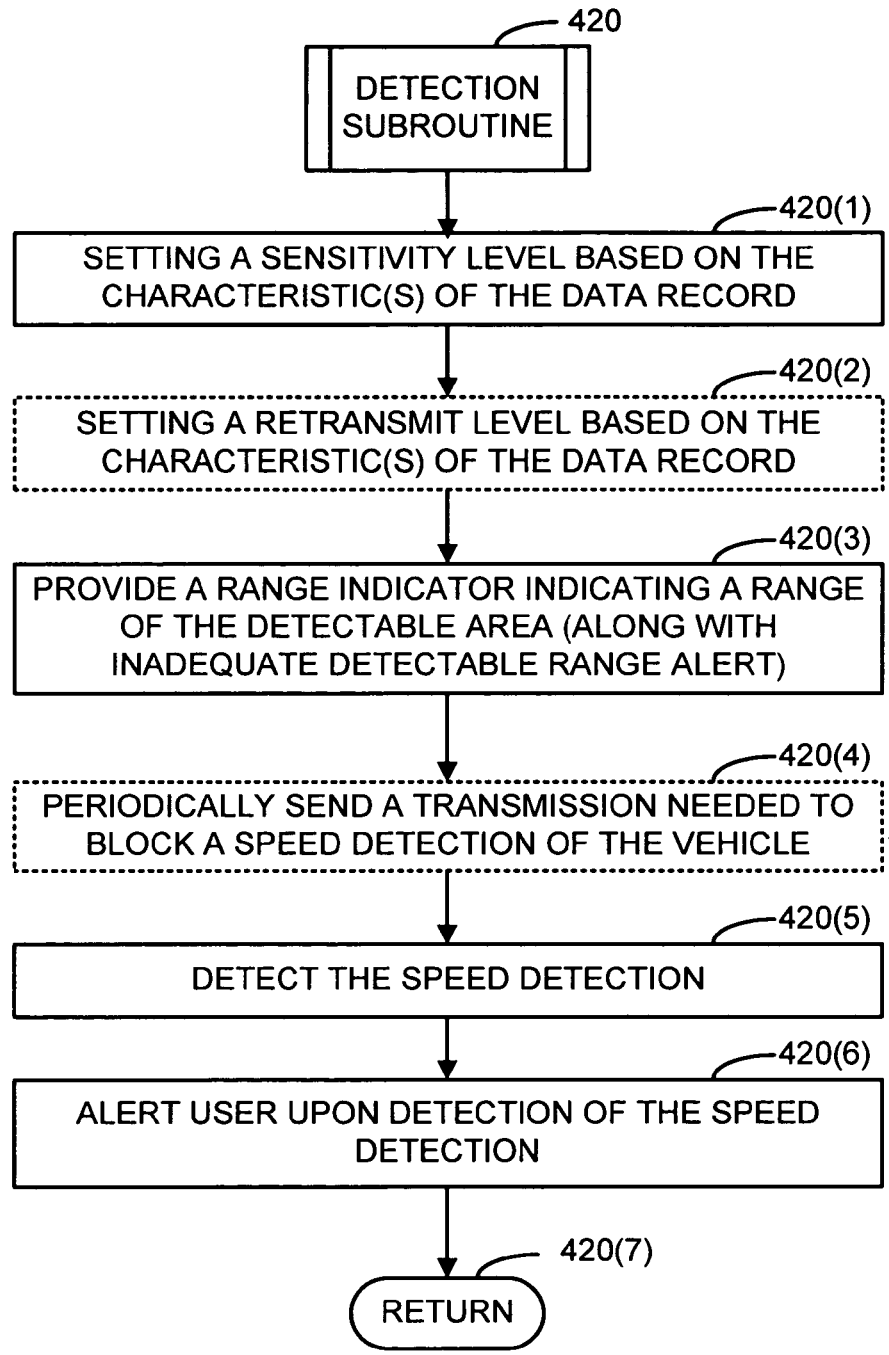
FIG. 8 is a flow chart diagram of a detection subroutine process depicted in FIG. 7 according to various embodiments.

Turning now to FIG. 7, a flow diagram of a detection process according to various embodiments is shown and indicated generally at 400. According to one embodiment, the processes shown in FIGS. 7 and 8 are implemented at the navigation system 300. Specifically, the processes are implemented as the speed trap applications 338 of the navigation program 334 in the navigation system 300 (FIG. 5). This particular detection process 400 shown starts 402 with the current position and the current speed of the vehicle being obtained 404, 406. For the current position, a latitude and longitude of the current position are typically first gathered by the positioning system 312 (FIG. 5), such as a global positing system ("GPS"). Other units, such as dead-reckoning units, may also be used to obtain the current position. For the current speed of the vehicle, the speed equipment 312 (FIG. 5) is used. Other methods of obtaining the current position and the current speed of the vehicle are readily appreciated by a skilled artisan, and as such, they are within the scope of the various teachings.

Using the latitude and longitude, a road segment on which the vehicle is traveling on is determined from the geographic database 324. In particular, a well known process called map matching is perform for identifying the road segment represented in the geographic database that corresponds to the latitude and longitude of the current position. Once the road segment is identified, the navigation system 300 can access various attributes relating to this road segment either from the road segment data record and/or the speed trap data record.

Once the current position (e.g., the road segment that the vehicle is traveling on) of the vehicle is obtained, the speed limit along the road traveled by the vehicle is assessed 408 from the geographic database. After which, a determination 410 is then made as to whether the current speed of the vehicle corresponds at least in a predefined way with the speed limit along the road. Specifically, in this embodiment shown, a determination 410 is made as to whether the current speed is greater than the speed limit. This determination 410 is included for avoiding trivial alerts, because the vehicle does not have to detect the police speed detector (i.e., speed detection of the vehicle) when the vehicle is traveling within the allowed speed limit. If this is the case that the current speed is, in fact, not greater than the speed limit 410, the process ends 412. If, on other hand, the current speed is greater than the speed limit 410, another determination 412 is made as to whether a speed trap data record associated with the road segment, on which the vehicle is traveling on, is present in the geographic database.

As readily appreciated by one skilled in the art, a threshold can be further used for a more intelligent and dynamic implementation for avoiding trivial alerts. The threshold can be configured to avoid trivial speeding over the speed limit of the geographic area. Since what is trivial depends greatly upon the attributes of the given geographic area, a threshold can be used in conjunction with the geographic database to determine the proper time to not detect the police speed detector. For example, five miles per hour over the speed limit may be trivial on a highway, whereas five miles over the speed limit should be avoided in residential area. These and other useful exemplary implementations can be included in the speed trap applications. For the sake of brevity though, these various implementations are not shown, but they are within the present scope of the various teachings, since they are readily appreciated by one skilled in the art.

Turning back to FIG. 7, when the speed trap data record is present 412, the speed trap data record is accordingly obtained 414. If, however, a speed trap data record is not present in the geographic database, a road segment data record associated with the current position is, instead, obtained 416. Whichever data record, being either the road segment or speed trap data record, is obtained 414, 416, one or more predefined characteristics are obtained 418 from the data record. A detection subroutine 420, specifically shown in FIG. 8, is then initiated and the detection process 400 ends 422.

Referring now to FIG. 8, a flow chart diagram of the detection subroutine 420 is shown. Once the predefined characteristics are obtained, the sensitivity level (e.g., detection) and the retransmit level (e.g., blocking), which is optional, are set 420(1), 420(2) based, at least in part, on the predefined characteristics from the data record. It should be noted that the predefined characteristics needed to properly determine the sensitivity or retransmit level may greatly vary. For example, if the speed trap data record is present, the needed characteristics of sensitivity and retransmit level are predefined in the speed trap data record. On the other hand, if the road segment data record is used instead of the speed trap data record, other predefined characteristics may assist to properly determine the level based on whether the vehicle is traveling on a highway or on a road in a city. Other predefined characteristics may include an administrative district, population density, a shopping district, a residential area, a business district, a number of points of interest, a speed limit, a functional class, and any attribute that can be used to set the sensitivity level.

Depending upon the configuration of the system and/or the navigation data included, an optimal predefined characteristic(s) for setting the sensitivity level may vary. In one embodiment of setting the sensitivity level, the detection process 400 may use a type of the road, such as the data 204(2) indicating a functional class of the road segment, traveled by the vehicle. For example, the functional class can provide an indication of whether the road is a highway or a local road in a city. Specifically, a road segment of functional class "1" suggests a road on a highway, while a functional class "5" suggests a local road within a city. Accordingly, the detection process 400 sets the highway sensitivity level if the road segment is functional class "1" and the city sensitivity level if the road segment is functional class "5."

In another embodiment, the detection process 400 may provide a city sensitivity level when the road segment is indicated as a shopping district or a high population density, which tends to include more frequency interruptions caused by, for example, automatic door openers. Of course, other sensitivity levels are also possible in addition to the city level and highway level. Since numerous embodiments of the predefined characteristics are available and readily appreciated by one skilled in the art, and other predefined characteristics, even if not specifically described, are within the scope of the various teachings provided.

In an alternative embodiment, the detection process 400 also uses the geometric shape of the road to provide a more intelligent algorithm to set the sensitivity level. This embodiment assists in reducing the number of false alarms while effectively provide warning on the vehicle of the police speed detector. In some cases, the vehicle radar detector set at the city or highway sensitivity level may not be able to detect the police radar positioned proximate a curve in sufficient time to alert the user to reduce speed prior to police detection. According to one embodiment, the sensitivity level is increased from a previous level when the vehicle is approaching the curve and returned to the previous level when the vehicle exits the curve. The detection process identifies the approaching curve by evaluating data from the geographic database that indicate road geometry.

In one embodiment, the detection process obtains shape points from the geographic database that indicate (latitude and longitude) positions along the road segment. Using the shape points, the detection process determines whether the shape point positions indicate a curve. If the curve is present, the detection process increases the sensitivity level. Once the shape points indicate that the curve ends, the detection process returns the sensitivity level to its pre-curve level. In a further embodiment, the detection process evaluates a sharpness of the identified curve and sets the sensitivity level increase according to the sharpness of the curve.

According to a specific embodiment, the user may also be optionally provided 420(3) a range indicator of the detectable area of the vehicle radar detector. In this embodiment, a bubble-shaped area that indicates the range of the detectable area, such as the protection ranges illustrated in FIG. 6, may be included as the vehicle travels on the road segments. This added user interface display can inform the end user more detailed information of the ranges of the vehicle radar detector as they relate to the road segments. For example, a map display on the user interface of the navigation system may include a bigger or smaller bubble-shaped area depending upon the ranges of detectable area, sensitivity level, and the direction of the vehicle. According to one embodiment, this bubble-shaped area may be added as a transparent layer on the map display of the navigation system.

In one embodiment, the size of the detectable area is estimated based upon the sensitivity level set by the detection process. For example, the highway sensitivity level may provide a detectable area extending x feet in front of the vehicle and y feet on either side of the vehicle, whereas the city sensitivity level may provide a smaller detectable area extending w feet in front of the vehicle and z feet on either side of the vehicle. Using the extents of the detectable area, a map display application generates the bubble-shaped area on the map display corresponding to a scale of the display. For example, the bubble-shaped area representing the detectable area that extends x feet in front of the vehicle would overlay a portion of x feet on a straight road directly in front of the vehicle on the map display.

In another embodiment, the size and shape of the bubble-shaped area representing the detectable area on the map display is modified according to the terrain of the geographic region around the vehicle. For example, when the vehicle is traveling up a hill, the vehicle radar detector is unlikely to detect a police speed detector located on a downward side of the hill. Accordingly, the map display application modifies the bubble-shaped area so it does not extend beyond the top of the hill on the map display. The navigation system identifies an approaching hill by obtaining data indicating geographic terrain or elevation from the geographic database. In one embodiment, data representing slope or road grade along the road segment is obtained. The slope data provides positions along the road segment at which the slope changes and corresponding values of slope along the road segment. If the slope data indicates that the slope changes from a positive to a negative value, the navigation system determines that a hill exists. With such a hill indicated, a modified bubble-shaped area may be showed to indicate only the portions of the road segment that the vehicle radar detector can, in fact, detect. The map display with the determined range of the detectable area can be provided to the user to indicate locations with limited detectable area at slowing down the vehicle may be appropriate. The display can provide not only a front view of the detectable area but also a side view.

At times though, the vehicle radar detector may not effectively detect a police speed detector given, for example, such a hill terrain. To address this problem, the user can be additionally alerted 420(3) when the range of detectable area is inadequate to detect the police speed detection of the vehicle because of the hill terrain and/or curved road segment. Moreover, the inadequate detectable range alert can also be displayed when the speed trap record 208 includes the road segment as a speed trap blackspot (FIG. 4).

Turning back to FIG. 8, for the embodiment that blocks the speed detection, a transmission at the set retransmit level needed to block the speed detection of the vehicle is periodically sent 420(4). And in the embodiment that detects the speed detection, after the speed detection is detected 420(5), the user is alerted 420(6) of the speed detection. Once the user has been alerted, the detection subroutine process ends 420(7) at this point. The detection process 400 may then be repeated periodically, and multiple embodiments are contemplated.

According to one embodiment, the detection process 400 may be repeated by a predefined time interval. This, however, may not be sufficient depending upon the speed of the vehicle. For example, a short predefined time interval may be too excessive when the vehicle is traveling on the highway, while a long predefined time interval may not effectively accommodate the rapid change in city travel. Another embodiment may be to repeat the detection process 400 every time a new latitude and longitude have been determined from the positioning system 412. The use of a new latitude and longitude position, however, may be too excessive, especially for highway travel. In alternative embodiment, the detection process 400 may be repeated when the current position of the vehicle indicates a new road segment, which may be determined from the geographic database 324. Other embodiments may include a combination of the various implementations. A skilled artisan can readily appreciate these various embodiments, although some may not be specifically shown. As such, these various embodiments are within the scope of the teachings described.

Because multiple characteristics are considered in order to obtain the proper sensitivity and retransmit level given the geographic location, the optimized setting of these levels is automatically set without user intervention. In other words, the proper settings of the vehicle radar detector are substantially transparent to the end user. At the same time, the number of false alarms can also be greatly reduced, since the geographic database along with the speed trap database provides a more sophisticated radar detection technique than prior methods. The users, though, are also provided information when needed. For example, the user is alerted with range indicators including a display view of the detectable area accounting various characteristics of a road curvature, a direction of travel, a terrain model of the road segments, and/or a road gradient or slope model. As a result, an improved vehicle radar detector is provided which models more clearly with the driving experience in a real world terrain.

Moreover, although the two most common warning techniques of either detecting or blocking the speed detection of the vehicle are provided as practical examples, the number of available ways to detect the speed detection is practically unlimited. Moreover, these detection, blocking, and other known techniques can be combined to provide a more extensive vehicle radar detector. As such, other techniques to detect the speed detection, though not specifically shown, are contemplated and are within the scope of the various teachings.

IV. Alternative Embodiment

A. Overview

Figure 9:
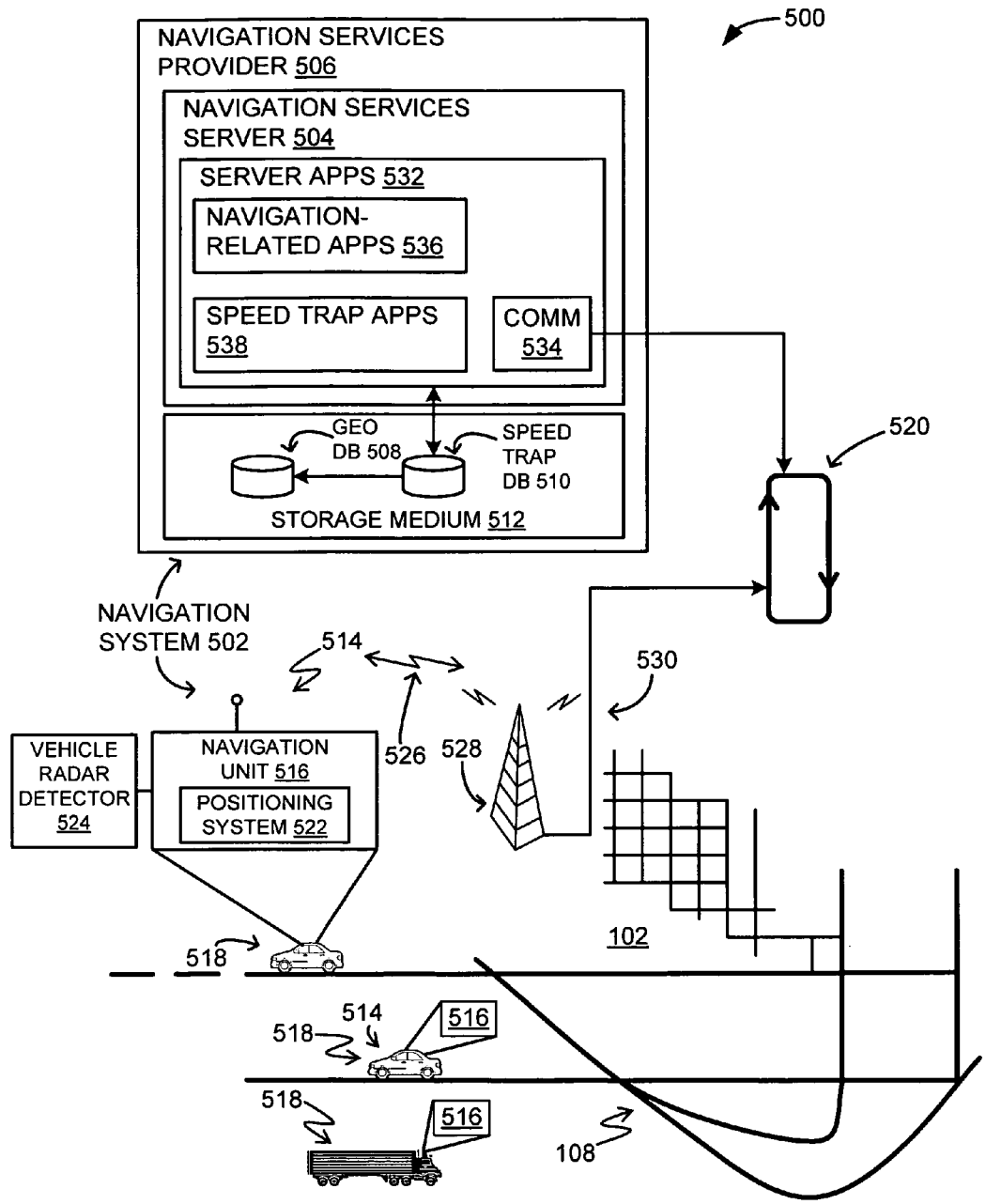
FIG. 9 is a block diagram of a navigation system according to an alternative embodiment.

Referring now to FIG. 9, an alternative embodiment is shown and indicated generally at 500. In particular, an off-board or hybrid navigation system 502 is shown. In this navigation system 502, other information, such as traffic information and construction information, may be dynamically available, which may not be seamlessly adapted in the stand-alone navigation system 300 shown in FIG. 5. In this alternative embodiment, the geographic region 102 and the portion of the road network 108 is shown. The navigation system 502 similarly serves end users (e.g., vehicle drivers and passengers, as well as other persons) in the geographic region 102. The navigation system 502 is used by the end users to obtain navigation-related services with respect to the geographic region 102. The navigation-related services include information about travel along the road network 108, including route calculation and guidance, people and business finding services (e.g., electronic yellow and white pages), maps, point of interest searching, destination selection, and so on.

The navigation system 502 is a combination of hardware, software, and data. The navigation system 502 includes remote components (i.e., hardware, software or data located at a central location that is remote from the end users) and local components (i.e., hardware, software, or data located physically with each end user). Included among the remote components of the navigation system 502 is a navigation services server 504. The navigation services server 504 includes appropriate computer hardware and software to run network applications. The navigation services server 504 is maintained and operated by a navigation services provider 506.

Associated with the navigation services server 504 is the geographic database 508 and a speed trap database 510, which are is stored on a storage medium 512 that is accessible to the navigation services server 504. The storage medium 512 may include one or more hard drives or other storage media. The geographic database 508 may be organized to facilitate performing navigation-related functions. Moreover, the geographic database 508 may contain all or part of the data from the geographic database 200 shown in FIGS. 2, 3, 4, and 5. In one embodiment, the geographic database 508 is developed by NAVTEQ North America, LLC of Chicago, Ill. However, it is understood that the inventive concepts disclosed herein are not restricted to any particular source of data. The speed trap database 510 may be organized to facilitate speed trap related functions. The speed trap database 510 may be further be a separate database from the geographic database 508 and/or integrated as part of the geographic database 508. The speed trap database 510 may be similar to or different from the speed trap database 326 shown in FIG. 5. Data to be included in the speed trap database 510 depends upon the configuration of the overall paradigm 500 shown.

The local components of the navigation system 502 include the various computer platforms 514 operated by the end users to request and obtain navigation-related and map-related features and geographic data from the navigation services provider 506. These various computer platforms 514 (also referred to as "end user computing platforms" or "client computing platforms") may include navigation units 516 located in vehicles 518 or any other types of computing devices that have the appropriate hardware and software to access the navigation services provider 506 over a data network 520. Referring to the embodiment of FIG. 9, some of the end user computing platforms 514 include a positioning system 522 and a vehicle radar detector 524. The positioning system 522 may include a GPS system, inertial sensors, wheel pulse sensors, etc. Using this positioning system 522, the position of the end user's computing platform 514 can be determined. The vehicle radar detector 524, although shown as a separate unit from the navigation unit 516, may be integrated as part of the navigation unit 516 that may also include a speed trap application (not shown).

Turning to the types of communication types contemplated, the data network 520 may use any suitable technology and/or protocols that are currently available, as well as technology and/or protocols that become available in the future. The data network 520 may be part of, or connected to, the Internet. A portion of the network 520 may include a wireless portion 526. The wireless portion 526 of the data network 520 enables two-way communication between the mobile end user computing platforms 514 and the service provider 506.

The wireless portion 526 may be implemented by any suitable form of wireless communication, including cellular, PCS, satellite, FM, radio, or technologies that may be developed in the future. The wireless portion 524 may include one or more transmitters 528, such as a transponder tower, an antenna tower, an FM tower, satellites, or other suitable means. The transmitters 528 include an appropriate communication link 530 to the network 520 and/or service provider 506. The transmitters 528 include suitable technology that enables two-way communication between the service provider 506 and the end user computing platforms 514.

At the navigation provider 506 side, server applications 532 are included on the navigation services server 504. The server applications 532 may be stored on one or more hard drive(s) or other media operated by the server 504 and loaded into a memory of the server 504 to be executed. One of the server applications 532 is a communications application 534. The communications application 534 interfaces with the data network 520 in order to receive messages from and send messages to the end users.

Included among the server applications 532 are navigation-related applications 536. The navigation-related applications 536 use the geographic database 508 associated with the navigation services server 504 in order to provide the various different types of navigation-related services. In order to provide navigation-related features, the navigation-related applications 536 use data from the geographic database 508.

One of the navigation-related applications 536 is route calculation (not shown). The route calculation application receives an end user request to calculate a route to a desired destination. The request includes an identification of a starting location and the desired destination location. Given the starting location and the destination location, the route calculation application accesses the geographic database 508 and obtains road segment data entities 204 that represent segments around and between the starting location and the destination location. Using the geographic data, the application determines a solution route comprising a series of connected segments over which the end user can travel from the starting location and the destination location. The route calculation application may use any of various means or algorithms for this purpose. Any suitable route calculation method now known or developed in the future may be employed.

Another of the navigation-related applications 536 on the navigation services server 504 is a route guidance application (not shown). The route guidance application provides maneuver instructions for the end user to travel on the calculated route. In one embodiment, the route guidance application uses the series of connected road segments determined by the route calculation application, as well as additional information from the geographic database 508, to provide instructions to the end user to travel the route. The route guidance application may include applications that identify locations along the calculated route at which maneuvering instructions may be provided to the end user. The route guidance application may provide the maneuvering instructions to the end user all at once, or alternatively, the route guidance application may provide the maneuvering instructions one at a time. The maneuvering instructions are provided to the end user through a user interface included on the computing platform 514. The output of the route guidance may be conveyed audibly through speech synthesis or displayed on graphical maps on the user interface.

B. Navigation-Related Services Using Speed Trap Data

Further navigation-related applications 536 on the navigation services server 504 include speed trap applications 538.

The navigation services server 504, through the speed trap applications 538, may send out information from the geographic database 508 and/or the speed trap database 510 that may be relevant for alerting or blocking the police speed detector. For example, information from the server 504 may trigger the navigation unit 516 to send an alert to warn the user of the police speed detector causing the user to slow down or reroute the user to an area without any known speed traps. In one embodiment, completely transparent to the end user, the navigation unit 516 may send out a transmission to block the police speed detector based upon information from the server 504. According to another embodiment, while providing the navigation-related services and features to the end users, the speed trap applications 538 may provide speed trap information. In other specific embodiment, the speed trap applications may not necessarily be part of the navigation-related application.

For example, as the vehicle 516 travels along the road segment, the speed trap applications 538 may send out relevant information for setting the sensitivity and/or the retransmit level to the vehicle radar detector 524 using the geographic database 508 and/or speed trap database 510. In this way, this sensitivity and/or retransmit level can be dynamically changed according to current traffic information or construction information. According to another embodiment, the sensitivity and retransmit level of the vehicle radar detector 524 may be internally set using databases 508, 510 that are saved locally. And the navigation services server 504 may send information relevant to the sensitivity and/or retransmit levels when the information may be different from the locally stored information due to change of road conditions, such as traffic information or road construction.

Because different states and/or cities have different regulations relating to transmission blockers and vehicle radar detectors, the speed trap applications 536 can be adapted and customized according to the local regulations based upon the current position of the vehicle. This type of speed trap data can be stored in a speed trap database 510 as either a separate database and/or integrated database of the geographic database 508. The speed trap database can be useful in providing the type of known speed trap devices, transmission, and/or any factors that may change the sensitivity level and/or the retransmit level for detecting or blocking the police speed detector. Since the database can also keep current traffic regulations and local ordinances, the process can be substantially transparent to the user.

According to another embodiment, a more real-time representation of the road segment conditions may be used to improve the vehicle radar detector 524. For example, real-time traffic information that indicates traffic congestion may automatically turn off the vehicle radar detector. In contrast, construction information of a road segment may override the normal speed limit. These types of dynamic information may be transmitted from the navigation services server 504.

In other embodiments, the speed trap applications 538 may be optimized using data stored in the speed trap database 510 that may provide data relating to population density, characteristics of the area, and speed limit of the geographic area. For example, the speed trap applications 538 may be adapted to send out information that triggers the navigation unit 516 to turn off the vehicle radar detector when the vehicle is stuck in traffic and/or the user is not speeding. Because implementations of the speed trap applications 538 may depend upon the information that is available from the speed trap database 510, many implementations of the speed trap applications 538 are within the scope of the various embodiments described.

Moreover, the various teachings described enable the navigation system 502 to provide more complex and customized settings than typical radar detectors.

Through the embodiments of various teachings, a more intelligent technique of detecting police speed detectors has been provided that, among other things, automatically, without any manual intervention, switches the sensitivity and retransmit levels of the vehicle radar detector using a geographic database of a navigation system. As a result, the protection to the drivers is substantially transparent, while a more accurate detection of the police speed detector is provided. In particular, since multiple characteristics are considered in order to obtain the most appropriate sensitivity and retransmit levels given the geographic location, the optimized setting of these levels is automatically set largely without user intervention. In other words, the proper settings of the vehicle radar detector are substantially transparent to the end user. At this same, the number of false alarms can be greatly reduced, since the geographic database along with the speed trap database provide a more sophisticated vehicle radar detection technique than typical vehicle radar detectors.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of detecting a speed detection of a vehicle using a geographic database of a navigation system, the method comprising:

obtaining a current position of the vehicle;

obtaining at least one predefined characteristic relating to the current position of the vehicle from the geographic database, the at least one predefined characteristic being a curvature of a road, a geometric shape of a road, a gradient of a road, or a slope of a road; and automatically setting a sensitivity level to detect a speed detection of the vehicle based, at least in part, on the at least one predefined characteristic obtained from the geographic database, wherein automatically setting the sensitivity level includes automatically adjusting a current sensitivity level being used for detection to another sensitivity level used for detection and includes automatically changing a range of detectable area used to detect the speed detection of the vehicle based on, at least in part, the at least one predefined characteristic obtained from the geographic database.

2. The method according to claim 1 further comprising:

detecting the speed detection based, at least in part, on the sensitivity level.

3. The method according to claim 2 further comprising:

alerting a user of the vehicle upon detecting the speed detection.

4. The method according to claim 2, wherein the speed detection comprises any one or more selected from a group of a signal transmission and a laser burst transmission.

5. The method according to claim 1 further comprising:

providing the range of detectable area to detect the speed detection of the vehicle.

6. The method according to claim 5, wherein the at least one predefined characteristic comprises any one or more selected from a group of a road curvature, a direction of travel, a terrain model of the road segments, a road gradient, and a road slope model.

7. The method according to claim 5 further comprising:
alerting a user of the vehicle when the range of the detectable area is inadequate to detect the speed detection of the vehicle.

8. The method according to claim 1, wherein the at least one predefined characteristic comprises any one or more selected from a group of an administrative district, a predefined sensitivity level, population density, a shopping district, a residential area, a business district, a number of nearby points of interest, a functional class of a road, speed limit, traffic information, a geometric shape of a road, speed detection type, and speed trap indication.

9. The method according to claim 1 further comprising:
setting a retransmit level based, at least in part, on the at least one predefined characteristic.

10. The method according to claim 9 further comprising:
periodically sending a transmission needed to block the speed detection based, at least in part, on the retransmit level.

11. The method according to claim 1 further comprising, prior to obtaining at least one characteristic relating to the current position of the vehicle from the geographic database:
obtaining a current speed of the vehicle;
obtaining a speed limit along a road traveled by the vehicle from the geographic database;
determining whether the current speed of the vehicle corresponds in at least a predetermined way to the speed limit along the road; and
obtaining the at least one predefined characteristic when the current speed of the vehicle corresponds in at least a predetermined way to the speed limit along the road.

12. The method according to claim 1 further comprising, prior to obtaining at least one predefined characteristic relating to the current position of the vehicle from the geographic database:
determining whether a speed trap data record associated with the current position of the vehicle is present in the geographic database;
obtaining a road segment data record associated with the current position of the vehicle when a speed trap data record is not present, wherein the at least one predefined characteristic is obtained from the road segment data record; and
obtaining the speed trap data record associated with the current position of the vehicle when a speed trap data record is present, wherein the at least one predefined characteristic is obtained from the speed trap data record.

13. A computer-readable medium having executable instructions stored thereon in accordance with the method of claim 1.

14. An apparatus having executable instructions stored thereon in accordance with the method of claim 1.

15. A method of detecting a speed detection of a vehicle using a geographic database of a navigation system, the method comprising:
obtaining a current position of the vehicle;
determining whether a speed trap data record associated with the current position of the vehicle is present in the geographic database;
obtaining a road type characteristic from the speed trap data record when the speed trap data record associated with the current position of the vehicle is present in the geographic database; and
automatically adjusting a sensitivity level to detect a speed detection of the vehicle based on the road type characteristic, wherein automatically adjusting the sensitivity level includes automatically increasing or decreasing a current sensitivity level being used for detection to another sensitivity level used for detection, based on the obtained road type characteristic, and includes automatically changing a range of detectable area used to detect the speed detection of the vehicle; and
displaying a boundary of the range of the detectable area used to detect the speed detection of the vehicle.

16. The method according to claim 15 further comprising:
detecting the speed detection based, at least in part, on the sensitivity level.

17. The method according to claim 16, wherein the speed detection comprises any one or more selected from a group of a signal transmission and a laser burst transmission.

18. The method according to claim 16 further comprising:
alerting a user of the vehicle upon detecting the speed detection.

19. The method according to claim 15 further comprising:
alerting a user of the vehicle when the range of the detectable area is inadequate to detect the speed detection of the vehicle.

20. The method according to claim 15, wherein the road type characteristic comprises any one or more selected from a group of a functional class of a road and a geometric shape of a road.

21. The method according to claim 15 further comprising:
obtaining the road type characteristic from a road segment data record when the speed trap data record associated with the current position of the vehicle is not present in the geographic database.

22. The method according to claim 15 further comprising:
automatically adjusting a retransmit level based, at least in part, on the road type characteristic; and
periodically sending a transmission needed to block the speed detection based, at least in part, on the retransmit level.

23. A computer implemented method of detecting a speed detection of a vehicle using a geographic database of a navigation system, the computer implemented method comprising:
obtaining a current position of the vehicle;
obtaining a road characteristic relating to the current position of the vehicle from the geographic database, the road characteristic comprising any one selected from a group of a road curvature, a terrain model of a road segment, a road gradient, a road slope model, a functional class of a road, and a geometric shape of a road; and
automatically setting a sensitivity level to detect a speed detection of the vehicle based on the road characteristic obtained from the geographic database, wherein automatically setting the sensitivity level includes automatically adjusting a current sensitivity level being used for detection to another sensitivity level used for detection including automatically changing a range of detectable area used to detect the speed detection of the vehicle; and
displaying a boundary of the range of the detectable area used to detect the speed detection of the vehicle.

24. The method according to claim 11, wherein determining comprises determining whether the current speed of the vehicle exceeds a threshold value above the speed limit, and wherein obtaining the at least one predefined characteristic comprises obtaining the at least one predefined characteristic when the current speed of the vehicle exceeds the threshold value.

25. The computer implemented method according to claim 23, further comprising:
obtaining data indicative of a geographic terrain or elevation from the geographic database; and
modifying the boundary of the range of the detectable area used to detect the speed detection of the vehicle based on the geographic terrain or elevation obtained from the geographic database.

\* \* \* \* \*